UNITED STATES PATENT OFFICE.

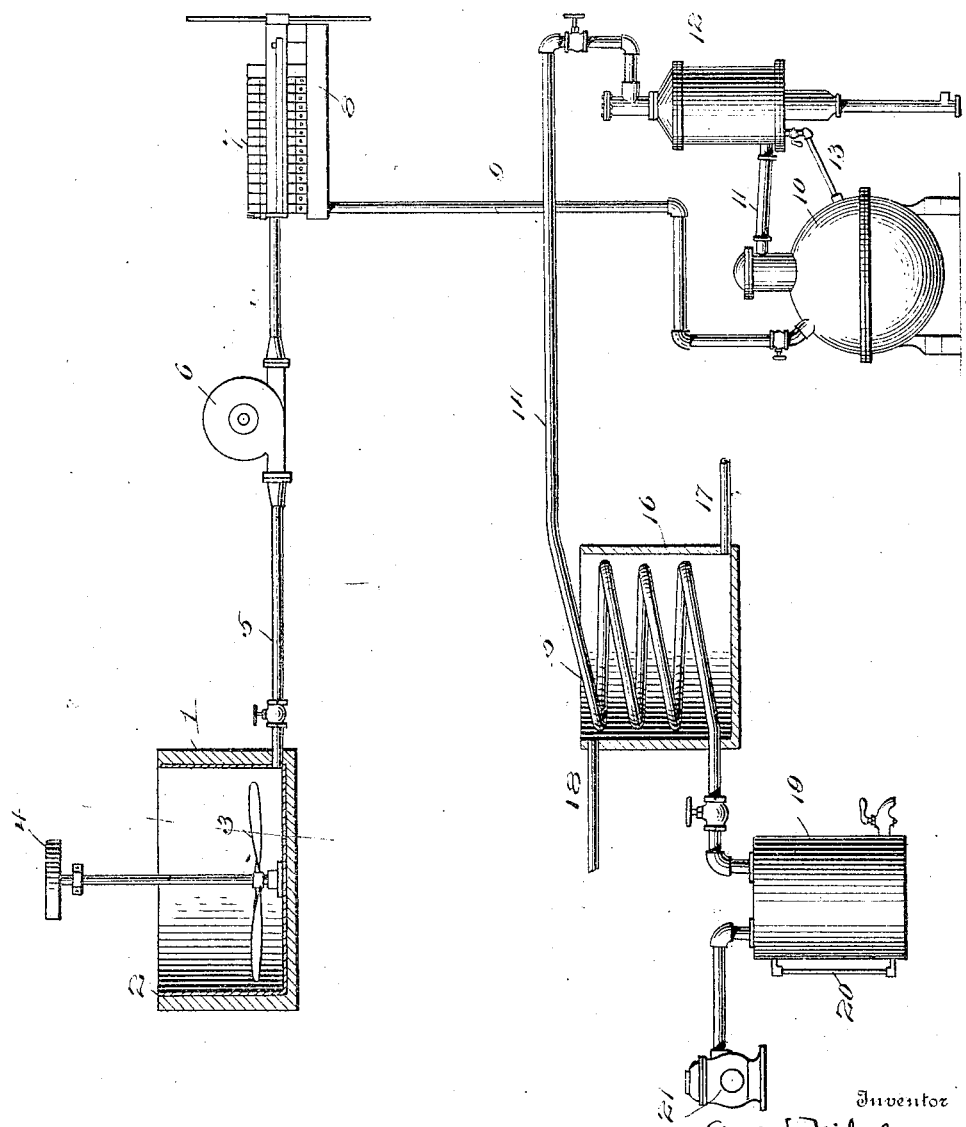

AXEL W. NIBELIUS, OF HACKETTSTOWN, NEW JERSEY.

RECOVERING SODIUM SULFATE AND SULFURIC ACID.

No. 873,070.  Specification of Letters Patent.  Patented Dec. 10, 1907.

Application filed June 18, 1906. Serial No. 322,313.

*To all whom it may concern:*

Be it known that I, AXEL W. NIBELIUS, a subject of the King of Sweden, (who have declared my intention of becoming a citizen of the United States), residing at Hackettstown, in the county of Warren and State of New Jersey, have invented certain new and useful Improvements in Methods of Extracting Sodium Sulfate and Sulfuric Acid from Salt Cake and Niter Cake, of which the following is a specification.

This invention relates to a process of extracting or separating sodium sulfate and sulfuric acid from niter cake and has for its object to provide an improved process, whereby such extraction or separation may be easily, economically and satisfactorily carried out.

In my improved process I effect the separation of the sulfuric acid from the sodium sulfate present in the niter cake by dissolving the sulfuric acid in a volatile solvent or a mixture of volatile solvents in which the sodium sulfate is either wholly insoluble or only slightly soluble. As examples of such solvents may be mentioned ethyl alcohol preferably in the form of denaturized alcohol, methyl alcohol preferably in the form of ordinary wood alcohol, amyl alcohol in the form of fusel oil, and compounds of the said alcohols, as amyl acetate and the like.

In the practical carrying out of my process in its preferred embodiment the procedure is as follows: Ground or granulated niter cake is mixed with the volatile solvent in acid proof vessels or lead lined tanks and agitated. The whole mass is then, while being stirred, pumped by means of an acid proof pump and pipe line to filter presses where the mass is separated under the pressure of the filter presses into neutral sulfate of sodium and a solution of the sulfuric acid in the volatile solvent. This solution which contains also the salts of iron originally present in the cake is then evaporated at ordinary atmospheric pressure or in vacuum and the volatile solvent separated and condensed. This distillation is carried out in lead lined or acid proof distilling apparatus, preferably under diminished atmospheric pressure to permit of volatilizing the solvent at a temperature lower than its boiling point. Distillation in vacuum is preferred as the strong sulfuric acid is then prevented from acting chemically upon the solvent. After being condensed the volatile solvent is re-used in the process. The neutral or normal sulfate of sodium which remains in the filter press is then washed with a volatile solvent of the character hereinbefore mentioned until a test for the presence of iron salts shows their absence. An anhydrous sodium sulfate is thus obtained which is free from iron and ready for use in glass manufacture or for other purposes. The sulfuric acid remaining after evaporating of the solvent is of high specific gravity and strength.

While the proportions of the volatile solvent employed and the niter cake may be varied as desired satisfactory results can be obtained by mixing the materials together in equal proportions by weight.

Glauber's salt is produced in the same manner as that above described in connection with the production of anhydrous sodium sulfate except that in producing Glauber's salt a sufficient quantity of water is added to the ground or granulated cake to provide water of crystallization before the volatile solvent is added. The solvent dissolves the sulfuric acid and precipitates the Glauber's salt $(Na_2SO_4 10H_2O)$. The mixture is then pumped to a filter press or centrifugal machine, and the Glauber's salt separated from the solution of sulfuric acid and the latter from its solvent as described above.

While my improved process is not dependent upon any particular apparatus for its successful operation, it can be advantageously carried out in the apparatus shown diagrammatically in the accompanying drawing forming a part of this specification.

In this drawing reference numeral 1 designates a tank in which the ground or granulated niter cake can be mixed with the volatile solvent. The tank 1 has a lining 2 of lead or other acid proof material and is provided with a stirrer 3 adapted to be actuated by a belt passing around the pulley 4. Connected with the tank at the lower portion thereof is a pipe line 5 lined with acid proof material, through which the mixed salt and volatile solvent are pumped by the pump 6 to one or more filter pressers 7 where the solution of sulfuric acid in the volatile solvent is separated from the remaining salt and collected in a receptacle 8. A pipe 9 leads from the bottom of the receptacle 8 to a vacuum still 10 in which the solution is distilled to separate the volatile solvent from the acid. A pipe 11 leads from the dome of the still to a water condenser 12 designed to separate water which may be volatilized with the volatile solvent from the vapors of such solvent. The pipe 13 serves to carry the condensed aqueous vapor back to the still 10. The pipe 14 connects the water condenser with the worm 15 of the condenser 16 in which the volatile solvent is condensed under the influence of a cold liquid entering the condenser through the pipe 17 and passing through the pipe 18.

Reference numeral 19 designates a receptacle having a gage glass 20 in which the condensed volatile solvent is collected and reference numeral 20 designates a vacuum pump by which a suitable vacuum is maintained in the apparatus.

Having thus described my invention I claim:

1. The process hereinbefore described of separating sulfuric acid from niter cake which consists in dissolving said acid in a volatile solvent in which sodium sulfate is insoluble, then removing the solution of the acid from the sodium sulfate and separating the said acid from the solvent.

2. The process hereinbefore described of isolating sulfuric acid and a sulfate of sodium from niter cake which consists in adding to said cake a volatile solvent capable of dissolving said acid, but in which sodium sulfate is insoluble, removing the solution of the acid from the sodium sulfate and separating the solvent from the acid by distillation.

3. The process hereinbefore described of isolating sulfuric acid and a sulfate of sodium from niter cake which consists in adding to said niter cake a mixture of volatile solvents capable of dissolving said acid, but in which sodium sulfate is insoluble, removing the solution of the acid from the sodium sulfate and separating the solvents from the acid by distillation.

4. The process hereinbefore described of isolating sulfuric acid and a sulfate of sodium from niter cake which consists in adding to said cake a volatile solvent in which said acid is soluble, but in which the sodium sulfate is insoluble, removing the solution of the acid from the sodium sulfate and separating the solvent from the acid by distillation under diminished atmospheric pressure.

5. The process hereinbefore described of isolating sulfuric acid and a sulfate of sodium in the form of Glauber's salt from niter cake which consists in adding to said niter cake in a dissolved state a volatile solvent capable of dissolving the acid but in which the sodium sulfate is insoluble, removing the solution of the acid from the sodium sulfate and finally separating the acid and the solvent.

6. The process herein described of isolating sulfuric acid and a sulfate of sodium from niter cake, which consists in dissolving said niter cake in water, adding to the said niter cake in solution in water a volatile solvent capable of dissolving the said acid, but in which the sodium sulfate is insoluble, removing the solution of the acid from the sodium sulfate, and finally separating the acid and solvent, substantially as described.

In testimony whereof I affix my signature in presence of two witnesses.

AXEL W. NIBELIUS

Witnesses:
 ROBT. A. COLE,
 JOHN SANDERSON, Jr.